(12) United States Patent
Wang et al.

(10) Patent No.: US 7,716,704 B2
(45) Date of Patent: May 11, 2010

(54) TELEVISION PROGRAM SELECTION APPARATUS AND METHOD

(75) Inventors: Chunzhi Wang, Indianapolis, IN (US); Darrel Wayne Randall, Danville, IN (US); Marc Aaron Kiefer, Indianapolis, IN (US); Wanda G. Thompson, Indianapolis, IN (US); Carolynn Rae Johnson, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 1115 days.

(21) Appl. No.: 09/879,573

(22) Filed: Jun. 12, 2001

(65) Prior Publication Data

US 2002/0188947 A1 Dec. 12, 2002

(51) Int. Cl.
*H04N 5/445* (2006.01)
*G06F 3/00* (2006.01)
*G06F 13/00* (2006.01)
*H04N 60/32* (2006.01)
*G06F 7/00* (2006.01)
*G06F 17/00* (2006.01)

(52) U.S. Cl. .............................. 725/46; 725/14; 725/61; 707/102; 707/104.1

(58) Field of Classification Search ................... 725/39, 725/46
See application file for complete search history.

(56) References Cited

U.S. PATENT DOCUMENTS

| 5,223,924 | A | | 6/1993 | Strubbe |
| 5,410,344 | A | | 4/1995 | Graves et al. |
| 5,610,653 | A | * | 3/1997 | Abecassis ................... 348/170 |
| 5,629,733 | A | | 5/1997 | Youman et al. |
| 5,694,176 | A | | 12/1997 | Bruette et al. |
| 5,734,444 | A | | 3/1998 | Yoshinobu |
| 5,758,257 | A | | 5/1998 | Herz et al. |
| 5,798,785 | A | | 8/1998 | Hendricks et al. |
| 5,801,747 | A | | 9/1998 | Bedard |

(Continued)

FOREIGN PATENT DOCUMENTS

EP A0774866 B1 5/1997

(Continued)

OTHER PUBLICATIONS

Motorola, Inc. "BiStatix TM Technology—A White Paper, Vers. on 4.1, www.motorola.com/smartcard/4_6_whitepaper.htm", published on the Internet on or before Jun. 12, 2001.

*Primary Examiner*—Dominic D Saltarelli
(74) *Attorney, Agent, or Firm*—Robert D. Shedd; Joseph J. Opalach; Catherine A. Cooper

(57) ABSTRACT

A television program selection system and method for selecting television programs for viewing or recording utilizing a guide schedule list which is received from a cable or satellite broadcaster for example, and comprises characteristics such as topic-theme, relevancy, and broadcast time data. The user can select a time period and optionally in addition a selection mode, which corresponds to one of the alternative algorithms used to sort the programs in the schedule and generate a list of suggested television programs to be displayed for the user to select a program. The default selection mode can use a conventional selection algorithm, and the optional selection mode can eliminate all programs which have any characteristics having a zero weighting.

18 Claims, 6 Drawing Sheets

U.S. PATENT DOCUMENTS

| | | | |
|---|---|---|---|
| 5,822,123 A | 10/1998 | Davis et al. | |
| 5,945,988 A | 8/1999 | Williams et al. | |
| 5,977,964 A | 11/1999 | Williams et al. | |
| 6,005,597 A | 12/1999 | Barrett et al. | |
| 6,020,883 A | 2/2000 | Herz et al. | |
| 6,023,267 A | 2/2000 | Chapuis et al. | |
| 6,088,722 A | 7/2000 | Herz et al. | |
| 6,133,909 A | 10/2000 | Schein et al. | |
| 6,169,543 B1 | 1/2001 | Wehmeyer | |
| 6,177,931 B1 | 1/2001 | Alexander et al. | |
| 6,182,287 B1 | 1/2001 | Schneidewend et al. | |
| 6,236,395 B1 | 5/2001 | Sezan et al. | |
| 6,243,142 B1 | 6/2001 | Mugura et al. | |
| 6,637,029 B1 * | 10/2003 | Maissel et al. | 725/46 |
| 6,701,523 B1 * | 3/2004 | Hancock et al. | 725/25 |
| 6,973,663 B1 * | 12/2005 | Brown et al. | 725/39 |
| 2005/0278741 A1 | 12/2005 | Robarts et al. | |

FOREIGN PATENT DOCUMENTS

| | | |
|---|---|---|
| EP | 854645 A2 * | 7/1998 |
| EP | 1091581 A2 * | 4/2001 |
| GB | A2343076 A | 4/2000 |
| JP | 10093879 A | 4/1998 |
| JP | 11008810 A | 1/1999 |
| JP | 2000059745 A | 2/2000 |
| JP | 2000253325 A | 9/2000 |
| WO | 0004708 A1 | 1/2000 |
| WO | WO 00/60854 A | 10/2000 |

* cited by examiner

TELEVISION PROGRAM SELECTION APPARATUS AND METHOD

FIELD OF THE INVENTION

This invention relates to apparatus and methods for assisting in the selection of television programs for viewing.

BACKGROUND OF THE INVENTION

As the number of available television channels increases, traditional magazine and newspaper printed schedules become more difficult to publish and to use for identifying programs which may be of interest out of the thousands being broadcast over the next few days or so.

Selecting a program to watch would be difficult even if all of the programs were to be listed in the traditional magazines or newspapers by category. Various web sites also provide television schedules, program information, and search tools, but they are also difficult to use and do not allow selection based on prior viewing history and habits.

Wehmeyer, et al., U.S. Pat. No. 5,867,226, disclosed a television system in which information for programs which are to be transmitted in the future is transmitted in advance to form a channel guide listing, allowing searching for specific television programs which satisfy certain criteria concerning a user's viewing preferences and upon, successful conclusion of the search, a suggested program list is generated in order to predict for the viewer certain programs which may be of interest. The Wehmeyer, et al., apparatus stores historical information about the particular television shows which the user watches and uses it as search criteria, or the search criteria is editable by the viewer to further refine the searches.

According to Wehmeyer, et al., a list of predictions of television programs which the viewer might find interesting can be generated from program guide data corresponding to future programs which is broadcast combined with data corresponding to programs previously watched using the apparatus. According to Wehmeyer, et al., whenever a program is watched for a given period of time, for example, 5 minutes or more, the system keeps a record and thereby the viewing habits and preferences can be determined, which allows the system to predict which upcoming programs should be of interest to the users of the apparatus.

The Wehmeyer, et al., system is designed to predict programs which may be of interest regardless as to when the programs will be broadcast. The system may suggest a list of programs scheduled for broadcast at times which may be inconvenient to the viewer. Furthermore, the Wehmeyer, et al., system does not other capabilities which allow the user to have better control of the suggest feature.

In addition, one satellite TV provider in the U.S. is DIRECTV, which offers access to more than 225 channels in digital-quality picture and sound. The DirecTV system broadcasts a program schedule of over 7000 programs to be broadcast over the next 14 days. The characteristics of programs are included in the program schedule as well as during the broadcast of the programs themselves, and those characteristics are received and processed by DirecTV receiving systems at the user or viewer level. Some examples of the characteristics in the DirecTV system are currently in the format Topic_Theme as follows:

Movies_Action/Adventure

Movies_Comedy

Movies_Drama

Movies_Fantasy

Sports_Baseball

Sports_Basketball

Sports_Boxing

Interests_Animals

Interests_Arts

Interests_Aviation

Interests_Business/Financial

Lifestyles_Cooking

Lifestyles_Exercise/Fitness

Lifestyles_Fashion/Style

News_News (currently News is a pseudo theme and not a theme)

Themes_Action/Adventure

Themes_Comedy

Themes_Current Affair

Themes_Drama

Show Types_Award Ceremony

Show Types_Event

Show Types_Game Show

Show Types_Mini-Series

Show Types_Movie

Age Appropriates_Children

Age Appropriates_Family

Age Appropriates_Adult

The DirecTV system assigns Topic numbers which are used in the broadcast information and the receivers and also a relevancy number which usually is from 1 to 10 for each Topic_Theme characteristic in each program. Some programs have multiple Topic_Theme characteristics, each with possibly different associated relevancy numbers.

The DirecTV receiver system can accommodate up to a predetermined number of individual users for which user profiles are stored, for example ten. The guide data used by the system may be received from a satellite television communication system. The satellite amplifies and rebroadcasts this signal to a plurality of receivers located at the residences of consumers via transponders operating at specified frequencies and having given bandwidths. Such a system includes an uplink transmitting portion (earth to satellite), an earth-orbiting satellite receiving and transmitting unit, and a downlink portion (satellite to earth) including a receiver located at the user's residence. In a such a satellite system, the information necessary to select a given television program is not fixedly-programmed into each receiver but is rather is down-loaded from the satellite continually on each transponder. The television program selection information comprises a set of data known as a Advanced Program Guide (APG), which relates television program titles, their start and end times, a virtual channel number to be displayed to the user, and information allocating virtual channels to transponder frequencies and to a position in the time-multiplexed data stream transmitted by a particular transponder. In such a system, it is not possible to tune any channel until the first APG is received from the satellite, because the receiver (IRD, or Integrated Receiver Decoder) literally does not know where any channel is located, in terms of frequency and position (i.e. data time slot) within the data stream of any transponder.

An APG is preferably transmitted on all transponders with the television program video and audio data, and is repeated periodically, for example, every 2 seconds. The APG, once received, is maintained in a memory unit in the receiver, and updated periodically, for example every 30 minutes. Retention of the APG allows instantaneous television program selection because the necessary selection data are always available. If the APG were to be discarded after using it to select a television program, then a delay of at least two seconds would be incurred while a new program guide was acquired, before any further television program selections could be performed.

Once the channel transponder carrying a desired television program is tuned, the data packets containing the audio and video information for that program can be selected from the data stream received from the transponder by examining the data packets for the proper SCID (Service Component Identifier) 12 bit code. If the SCID of the currently received data packet matches the SCID of the desired television program as listed in the program guide, then the data packet is routed to the proper data processing sections of the receiver. If the SCID of a particular packet does not match the SCID of the desired television program as listed in the program guide, then that data packet is discarded.

The current DirecTV receiver system measures five minute viewing time periods and the relevancy factors for Topic_Themes, and increments each Topic_Theme weight counter in the user's profile by the relevancy factor corresponding to a Topic_Theme in the program being viewed. The Topic_Theme counters are incremented by the relevancy factors for each five minute time period as the period elapses or expires. The counters store [number of 5 minute periods] X [relevancy] product for each Topic_Theme combination at a Topic_Theme cell for a unique user. The resultant weights in the counters in a user's profile are used to calculate relative weights of all the programs in the program schedule when the user requests a list of suggested programs at the user interface.

SUMMARY OF THE INVENTION

The present invention comprises in one aspect a television system for suggesting scheduled television programs to a user which receives television program schedule data comprising broadcast time and characteristics of scheduled programs; receives characteristics data for a television program being viewed by a user; stores a table of characteristic weights for a user; periodically increments characteristic weights in the table based on the characteristics data for the television program being viewed by the user; has user interface means for selecting a future time period and for requesting a list of suggested television programs scheduled to be broadcast during the future time period; and processor means for generating the list of suggested television programs by sorting the schedule according the characteristics of scheduled programs, the table of characteristics weights for the user, and any future time period selection, optionally allowing the user to select between a first mode wherein programs having a characteristic having a zero weight in the user profile can be suggested, and a second mode wherein programs having a characteristic having a zero weight in the user profile can not be suggested.

In another aspect, the invention comprises a method for sorting a television program schedule to assist a user in selecting a television program for viewing or recording based on characteristics of television programs previously watched by the viewer comprising the steps of receiving a schedule of television programs to be broadcast comprising scheduled broadcast time and characteristics of the programs; maintaining a user profile which comprises characteristics weights based on programs previously watched by the user; allowing the user to select a future time period; optionally allowing the user to select between a first mode wherein programs having a characteristic having a zero weight in the user profile can be suggested, and a second mode wherein programs having a characteristic having a zero weight in the user profile can not be suggested; and generating a list of suggested television programs within any the selected future time period based on characteristics of scheduled television programs and characteristic weights in the user profile, according to any selected mode.

The present invention permits the user to select a broadcast time period and/or a suggestion mode. The system will learn the viewer's viewing habits automatically if the "learning" is enabled. The suggestion program list will be generated based on any time period and any suggestion mode the user selected, combined with the viewing habits data in that user's profile. The viewing habits data in a user profile is usually the result of incrementing characteristics weight counters in a user profile at the completion of each time period the user watches a program having those characteristics. Programs are usually broadcast with characteristic relevancy data, and program schedules are also usually broadcast with characteristic relevancy data.

The apparatus can "learn" the viewer's viewing habits. This process utilizes characteristic data received in the broadcast along with each program which is watched, for example, Topic_Theme and relevancy, and number of time intervals, such as five minute intervals, the program is watched by a user. The system determines viewing trends which are user specific or, if no user is identified, are apparatus specific. The characteristic data can include time period, station, Topic or Theme, length of program, rating (adult, general, PG, for example), and any other characteristic data fields which are included with either broadcasts or with the program channel guide schedule.

When a broadcast time period is selected, the user may select, for example, "next two hours," "today," "this week," "next three days," "next fourteen days," for example.

The user can save time period and/or preferred characteristic selections as a default for future searches.

The user can select different mode to control the behavior of the suggestion. By selecting different mode, they can control to what extent a program matches his viewing habits will be suggested.

When the user requests a list of suggested programs at the user interface, the system will check the program's showing time (i.e., either the starting time or the stopping time should fall into the selected time period), apply the appropriate weighting algorithm depending on the suggestion mode the user selected, sort the programs according to their weightings, and provide a suggestion list with a preset maximum number of programs. The list can be arranged in a weighting-descending order or in a time order.

These programs are displayed in any of a variety of optional formats such as a scrollable list which includes one or more icons next to each program for use in selecting by the user a suggested program for future viewing, recording, and/or storing in a separate "intend to be viewed schedule."

DETAILED DESCRIPTION OF THE INVENTION

Figure 1:
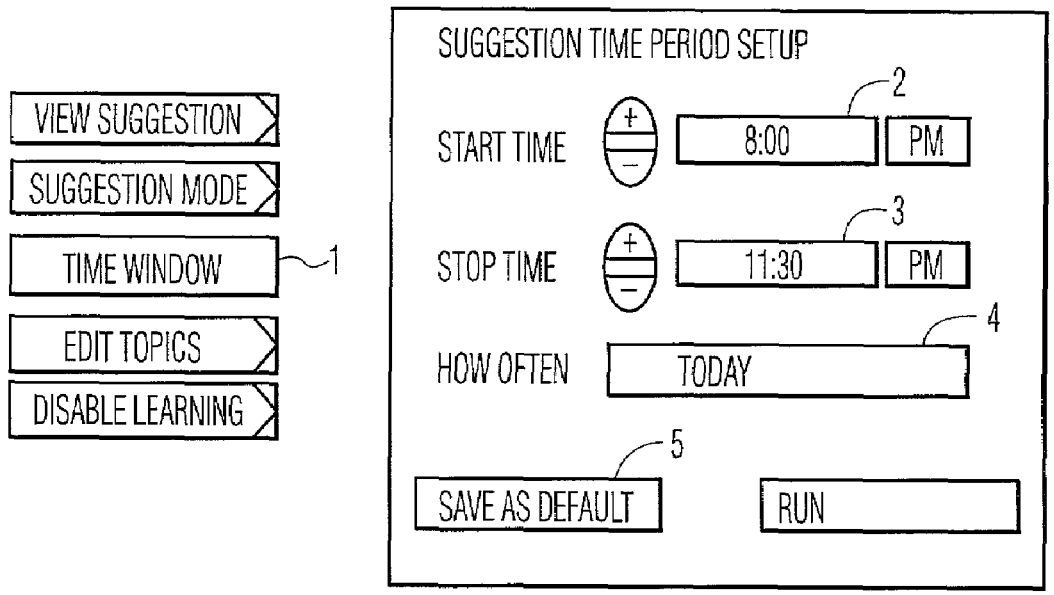
FIG. 1 is an illustration of a screen display for user entry of a broadcast time period, frequency, and default setting, in accordance with an aspect of the invention.

FIG. 1 shows a user interface display where the user has selected "Suggestion Time" mode by highlighting the icon 1 on a television screen display, and has selected 8:00 p.m. as the start time 2, 11:30 p.m. as the stop time 3, and today 4 as the frequency, and then has served this broadcast time period as a default by highlighting the save as default icon 5.

Figure 2:
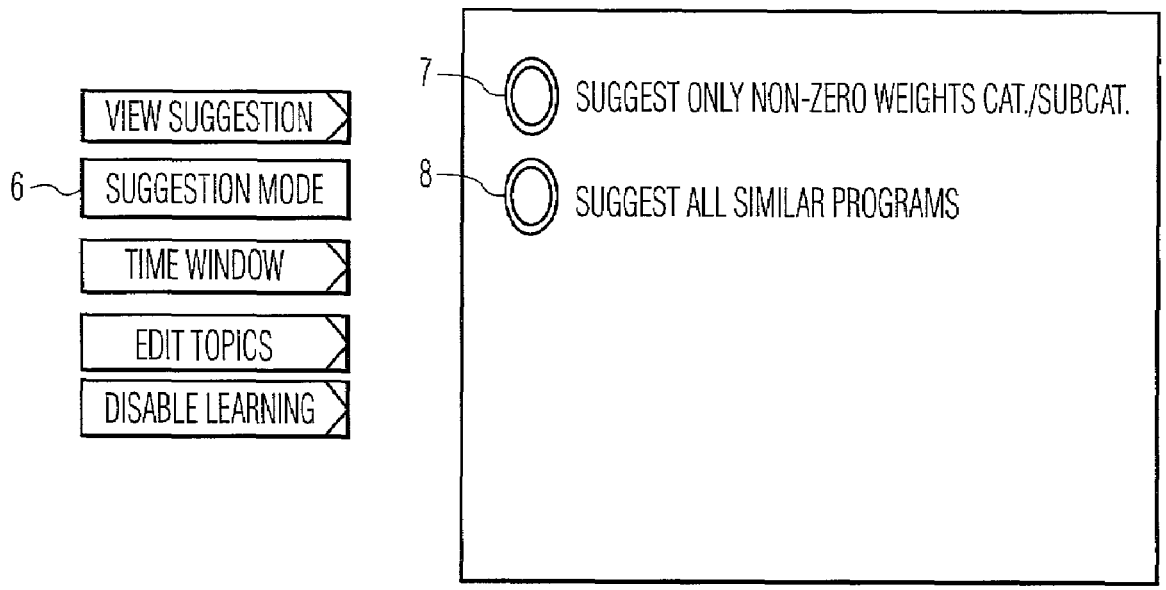
FIG. 2 is an illustration of a screen display for mode selection in accordance with an aspect of the invention.

FIG. 2 shows a viewer preference display where "Suggestion Mode" is selected 6. The first optional mode is "Suggest Only Non-Zero weighted Category/Subcategory" 7. By selecting this mode, only programs that their Category/Subcategory have a non-zero value in the viewing habit counter will be suggested.

FIG. 2 also allows selection of "Suggest All Similar Programs" 8, in which case, a program that it's Topic_Theme has zero value in the profile's counter could also appear on the suggestion list. The weighting algorithms are different for this two modes.

Figure 3:
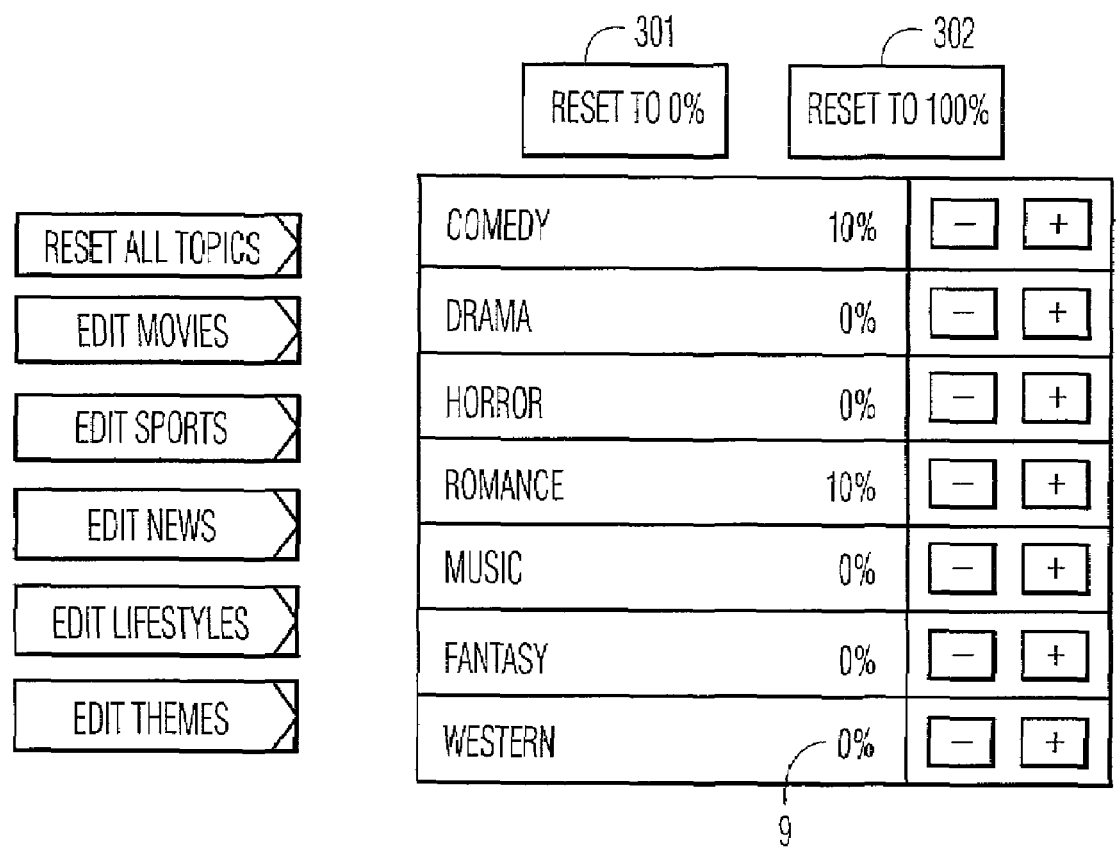
FIG. 3 is an illustration of a screen display for Topic_Theme editing in accordance with an aspect of the invention.

FIG. 3 illustrates a Category/Subcategory editing screen wherein the user can check to determine which Themes have a zero weighting in that user's profile and thereby determine which Category/Subcategory(s) are being excluded from the weighting and suggestion function when "Suggest Only Non-Zero weighted Category/Subcatagory" is selected. For example, Western 9 and others are illustrated in FIG. 3 with a zero weighting.

In another aspect according to the principles of the present invention, a user may select or highlight icon 301 to reset all the selected categories or subcategories of FIG. 3 to zero. This allows a user to easily reset the weighting without having to go through the whole list, one by one. Likewise, selection or highlighting of icon 302 allows the user to quickly set all weighting factors to 100%.

Figure 4:
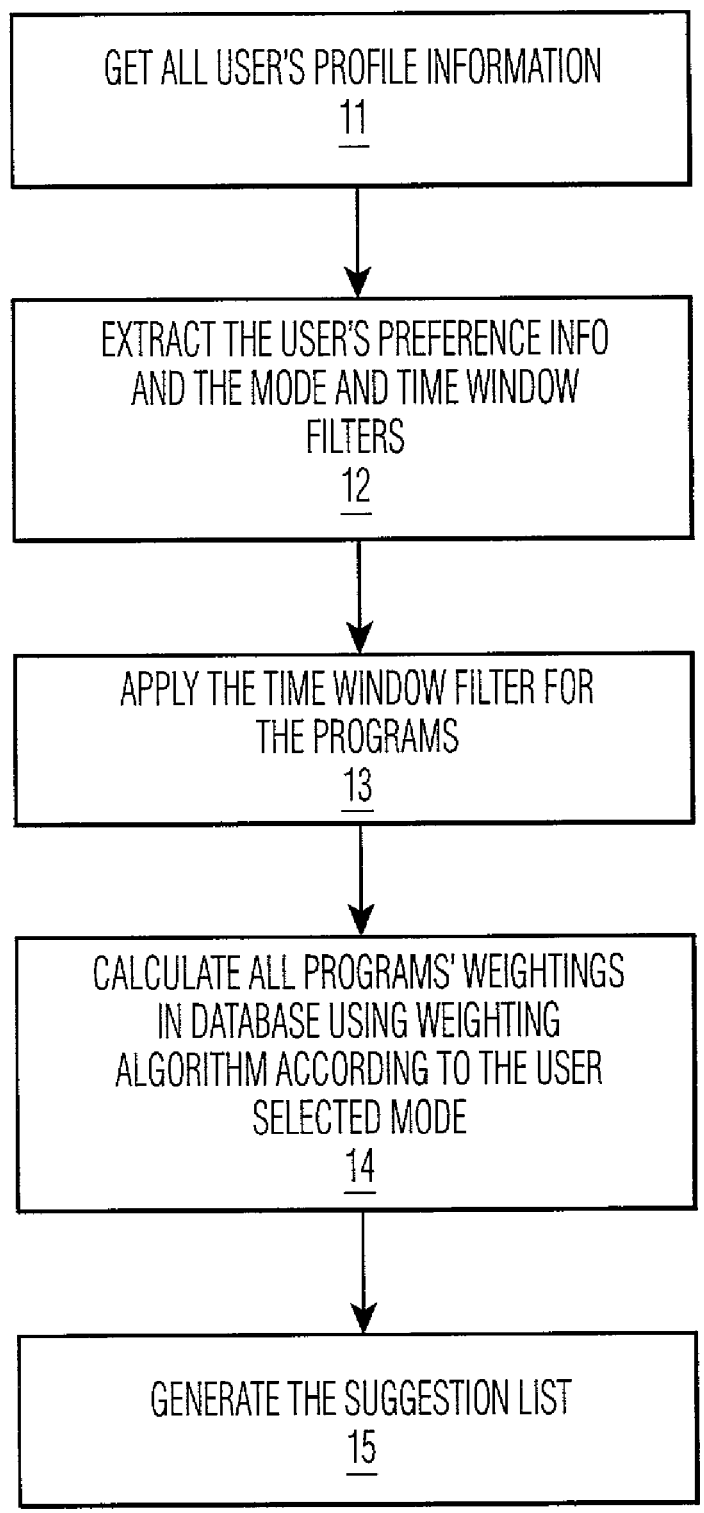
FIG. 4 is a flowchart useful in understanding the invention.

FIG. 4 illustrates the logic wherein the system first gets all user's profile information 11, extracts the user's preference information and the mode and time window filters 12, applies the time window filter for the programs 13, calculates all programs' weightings in the database using a weighting algorithm according to the selected mode 14, and then generates the suggestion list 15.

Figure 5:
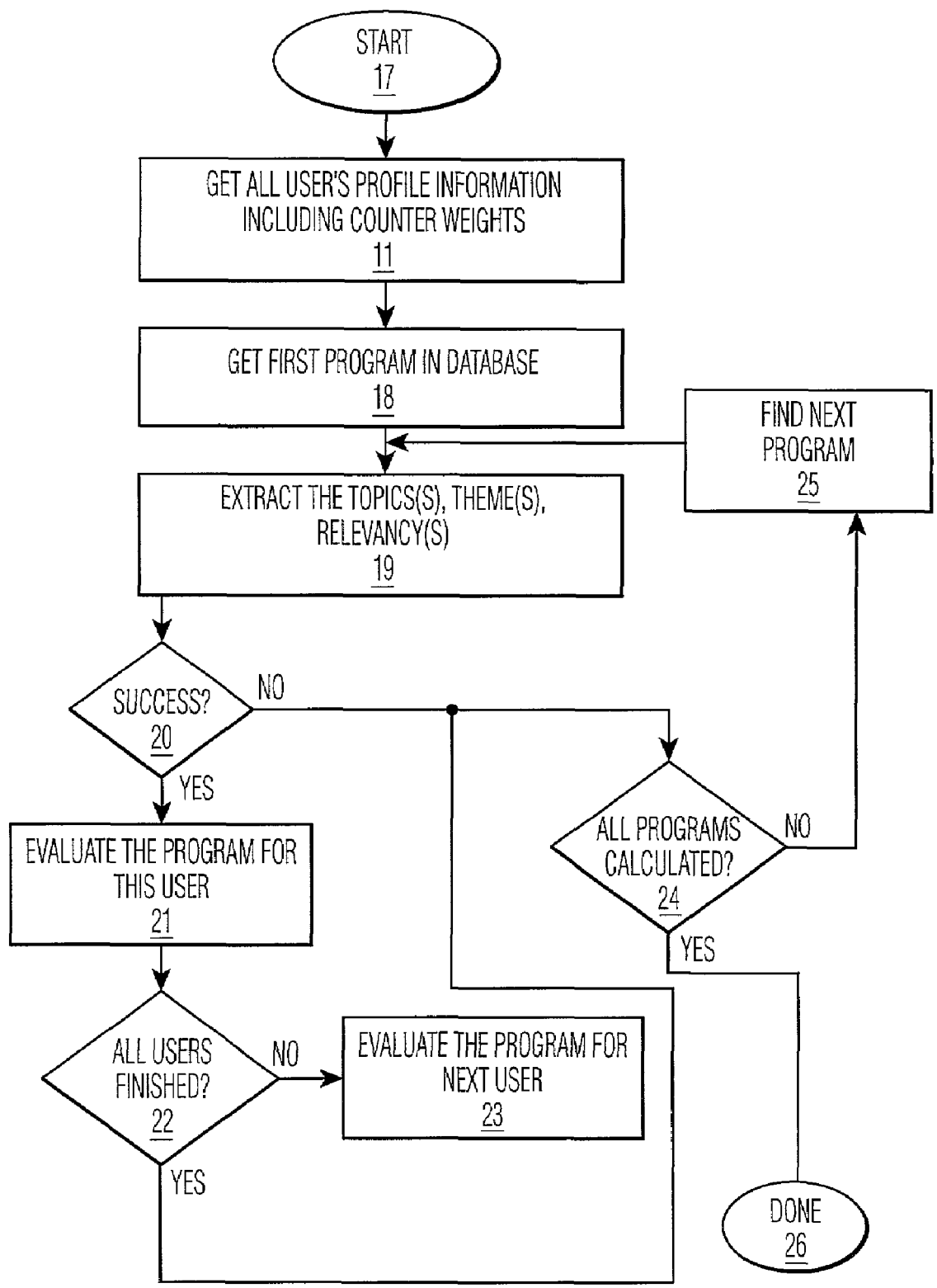
FIG. 5 is a flowchart useful in understanding the process of evaluating programs for each of a plurality of users.

FIG. 5 illustrates the logic wherein the system starts 17 by getting all user's weights information from the user profiles 11, gets a first program from the database 18, and extracts the program's topic(s), theme(s), and relevancy(s) data 19. If successful 20, the next logical step is to evaluate this program for this user 21, then successively for each additional user 23 until finished 22, and successively for all programs in the database by finding the next program 25 and repeating the extraction of topic(s), etc., until all programs are calculated 24 and the routine is done 26. Within the evaluation steps 21 and 23 are the steps of calculating the program's weighting using the weighting formula for the first and each successive user and inserting the program into the suggestion list for each user according to the program's calculated weighting.

Icons in the list of suggested programs displayed the user interface can be used to select programs for future viewing or instant viewing, in which case the selected program can be automatically tuned by the system. Alternatively, the user can choose to have the selected program automatically recorded when it is broadcast and received by the user's television system. In the latter case the programming can be automated using the time and channel data received.

The list can be scrollable and may be presented in time/date order or characteristic/relevancy order. Selected programs can be added to a "Plan to View" list which may also be scrollable.

In the suggestion calculation, a program's weighting is determined by the formula $Wp=(Rel1*Cth1+Rel2*Cth2+ \ldots +Reln*Cthn)+C2*(Ct1+Ct2+ \ldots +Ctn)$ wherein:

Wp is the weight for that program;

Cth1, Cth2 ... Cthn are the values in the counters in the user profile for Topic_Themes that the program belongs to;

Rel1, Rel2 ... Reln are the corresponding relevancies assigned by DirecTV for the Topic_Themes in the program, p;

Ct1, Ct2 ... Ctn are the average weights for the Topics in the program;

$Ct1=(Cth11+Cth12+ \ldots +Cth1\ m)/m$;

Cth11 is the counter value for Topic1_Theme 1, Cth12 is the counter value for Topic1_Theme2, ... Cth1 m is the counter value for Topic1_Theme m;

m is the Theme number in the first Topic;

$Ctn=(Cthn1+Cthn2+ \ldots +Cthnp)/p$;

Cthn1 is the counter value for Topic n_Theme 1;

Cthn2 is the counter value for Topic n_Theme 2, ...

Cthnp is the counter value for Topic n_Theme p;

p is the Theme number in the nth Topic;

and C2=0 if the user selected mode is "Suggest Only Non-Zero weighted Category/Subcategory," and at least one of the Topic_Theme counters which program belongs to has a zero value, then Wp=0; otherwise, if all Topic_Theme counters which the program belongs to have non-zero values, then C2=0;

if the user selected mode is "Suggest All Similar Programs," C2=1.

Figure 7:
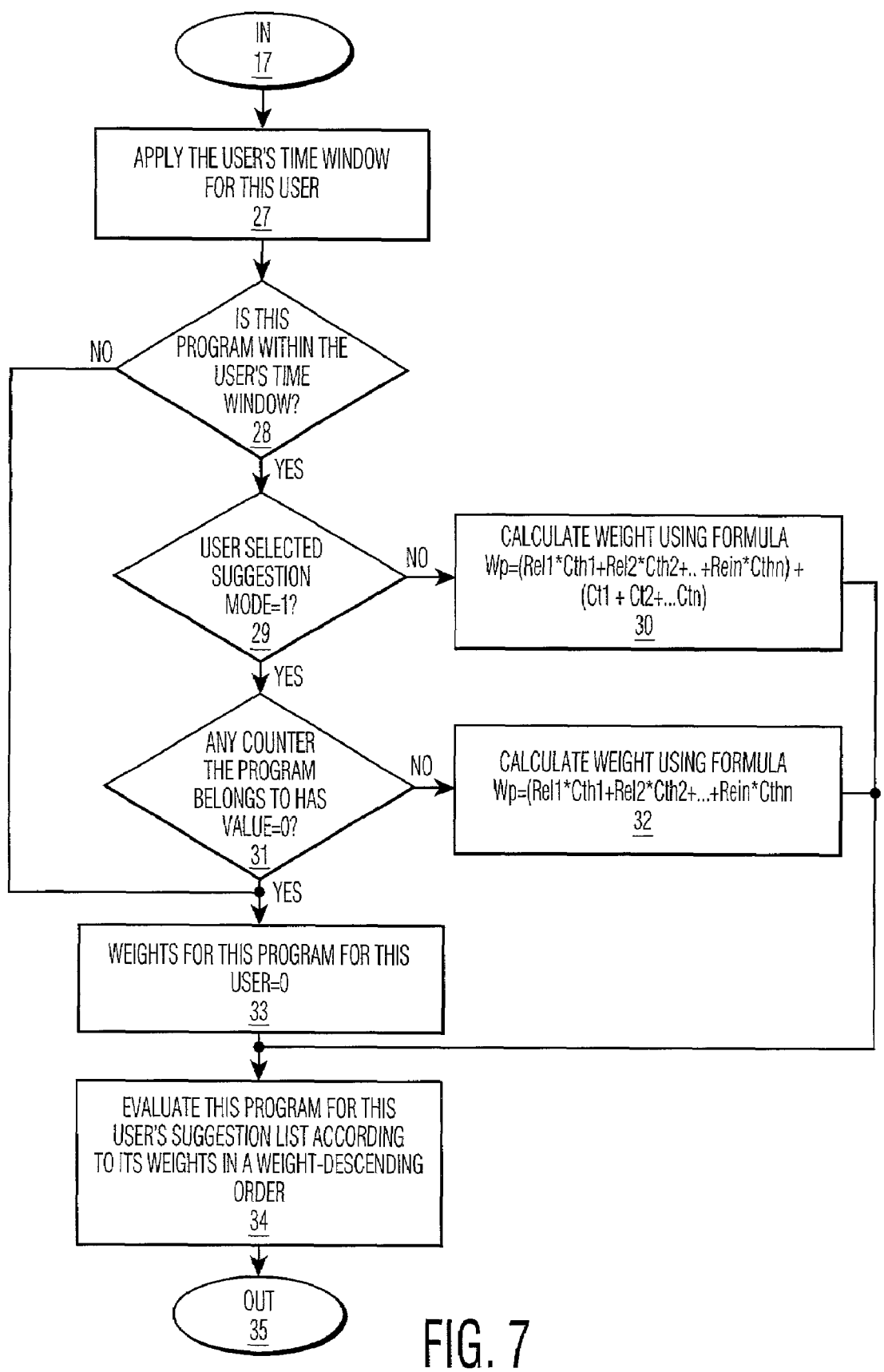
FIG. 7 is another flowchart in accordance with the present invention.

FIG. 7 illustrates the logic wherein the system applies this weighting formula to a program on the condition that the program is within the user's time window as selected at the user interface. This routine for each program starts 17 by applying the user's time window 27 and if the program is within the user's time window 28, the user's suggestion mode determines which calculation formula is applied. If mode one is selected 29, then the first formula 30 is calculated. If mode one is not selected, then if any counter to which the program belongs has a zero value, the alternate program weight calculation formula 32 is applied. If mode one is not selected and if no counter to which the program belongs has a zero value 31, then the weight for that program is set 33 to 0. Then the program is evaluated 34 for that user's suggestion list according to its weight in a weight-descending order, wherein the list is generated and the routine is completed 35. Mode one represents "Suggest Only Non-Zero Weighted Category/Subcategory" mode.

As an example of how the formula works in a specific situation, suppose in the user's profile, Movie/Comedy counter has value 50, Movie/Drama has value 120, and all the other Movie/XX counters have zeros, including the counter for Movie_Science Fiction. In calculating the weighting for a program "The Puppet Masters," the system extracts Topic_Theme and relevancy information for this program, which is Movie_Science Fiction, 10. If the user-selected mode is "Suggest Only Non-Zero Weighted Category/Sub-category," then the weight for that program, Wp=(10*0)+0*((50+120)/16)=0. Therefore, since The Puppet Masters has a zero weighting, when the list of suggested programs is requested in this mode, this program will not appear on the suggestion list.

On the other hand, if the selected mode is "Suggest All Similar Programs," which is the default mode, then the weight for the program "The Puppet Masters" would be calculated according to the formula as follows:

Wp=(10*0)+1*((50+120)/16)=10.6, so it could appear on the suggestion list because the 10.6 value of this program since the suggested program list is generated in relative Wp order starting from the highest.

In another example, assuming the same user, the program "Dirty Dingus Magee" has Topic_Theme:relevancies of Movie_Comedy:10, Movie_Western:5. If Suggest Only Non-Zero Weighted Category/Sub-Category is selected, the weight for this program is zero because the counter value for Movie_Western for this user is zero. However, if the Suggest All Similar Programs mode was selected by the user, then the weight would be calculated as follows:

$$Wp=10*50+(50+120)/16=510.6,$$

and the program would be ranked according to this weight when the suggested programs list is generated.

"Predictive agent list" or "viewed item list" may be generated as a screen display. Data is automatically stored in this predictive agent list by the apparatus of the invention, whenever a program is watched for a given period of time, for example, 5 or more minutes. In this way, a record is kept of the user's viewing habits so that the apparatus can be guided to make a prediction of which upcoming shows may be of interest to the viewer. The system will generate a list of programs similar to the ones previously viewed, but only within the selected broadcast time period as selected at the user interface displayed in FIG. 1. By selecting a different suggestion mode, the user can control how similar a program to his previous viewed programs will appear on the list. The option to limit the suggestion mechanism to a particular time period has the advantage reducing the burden on the system and results in quicker processing, as well as more relevant output since a viewer does not have to sort through programs to be broadcast at undesirable times. The mode selection gives the user a way to improve the program suggestion behavior. Some people like all Movies except Movie/Horror, so he can select "Suggest Only Non-Zero weighted Category/Subcategory" mode and let the Movie/Horror be Zero, so Movie/Horror kind of movie will never appear on the suggestion list.

Figure 6:
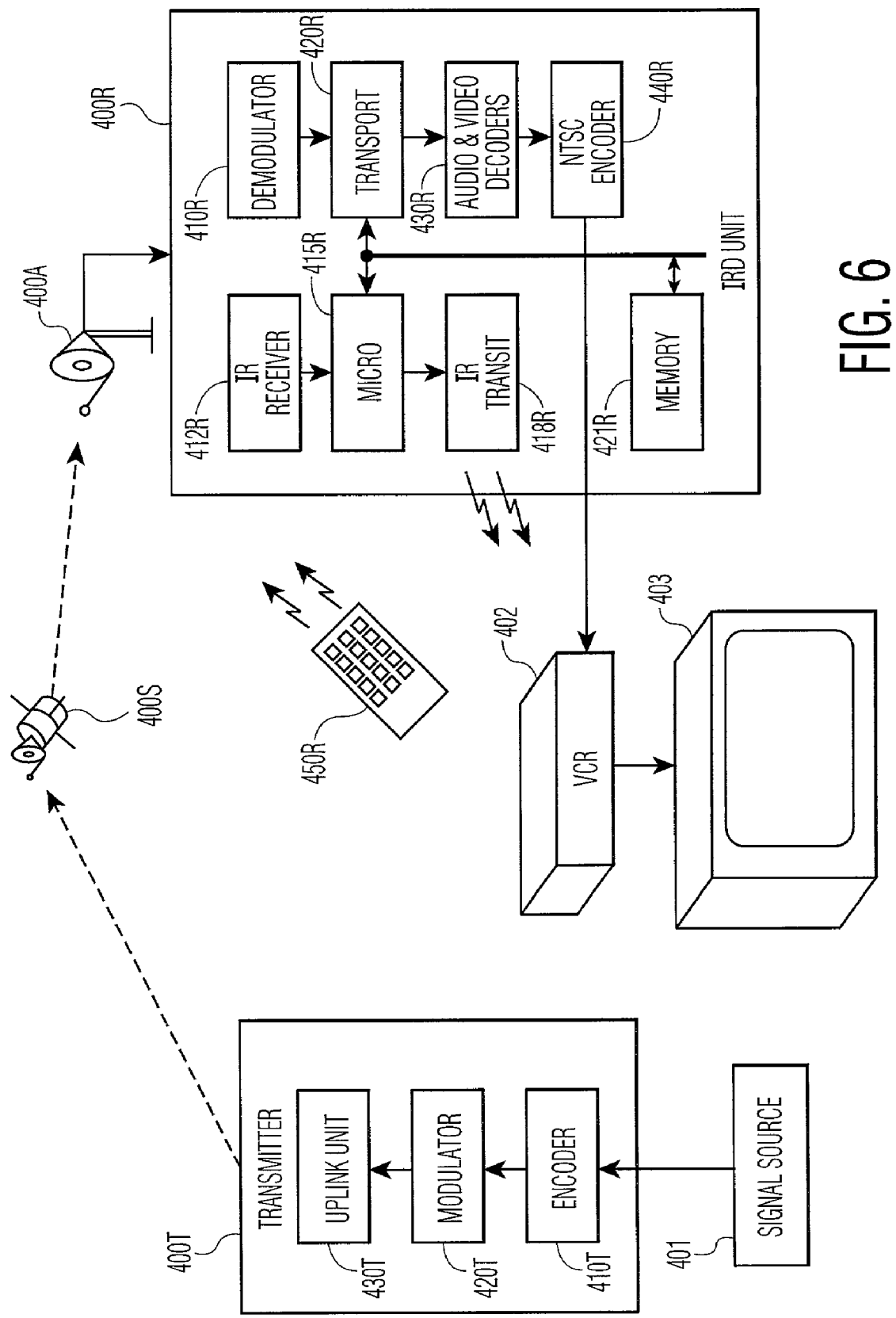
FIG. 6 is an illustration in block diagram form of apparatus suitable for use with the invention.

A brief description of system hardware, suitable for implementing the above-described invention, now follows. In FIG. 6, a transmitter 400T processes a data signal from a source 401 (e.g., a television signal source) and transmits it to a satellite 400S which receives and rebroadcasts the signal to a receiving antenna 400A which applies the signal to a receiver 400R. Transmitter 400T includes an encoder 410T, a modulator (i.e., modulator/forward error corrector (FEC)) 420T, and an uplink unit 430T. Encoder 410T compresses and encodes signals from source 401 according to a predetermined standard such as MPEG. MPEG is an international standard developed by the Moving Picture Expert Group of the International Standards Organization for coded representation of moving pictures and associated audio stored on digital storage medium. An encoded signal from unit 410T is supplied to modulator/Forward Error Corrector (FEC) 420T, which encodes the signal with error correction data, and Quaternary Phase Shift Key (QPSK) modulates the encoded signal onto a carrier.

Uplink unit 430T transmits the compressed and encoded signal to satellite 400S, which broadcasts the signal to a selected geographic reception area. The signal from satellite 400S is received by an antenna dish 400A coupled to an input of a so-called set-top receiver 400R (i.e., an interface device situated atop a television receiver). Receiver 400R includes a demodulator (demodulator/Forward Error Correction (FEC) decoder) 410R to demodulate the signal and to decode the error correction data, an IR receiver 412 for receiving IR remote control commands, a microprocessor 415R, which operates interactively with demodulator/FEC unit 410R, and a transport unit 420R to transport the signal to an appropriate decoder 430R within unit 400R depending on the content of the signal, i.e., audio or video information. An NTSC Encoder 440R encodes the decoded signal to a format suitable for use by signal processing circuits in a standard NTSC consumer VCR 402 and standard NTSC consumer television receiver 403. Microprocessor (or microcontroller, or microcomputer) 415R receives infrared (IR) control signals from remote control unit 450R, and sends control information to VCR 402 via an IR link 418R. Microprocessor 415R also generates the on-screen display (OSD) signals needed for presenting the interactive sentence, or confirmation sentence, to the user. Microprocessor 415R also receives and interprets cursor key X and Y information in order to control the highlighting of user choices in the on-screen displays.

Although the invention was described with reference to a satellite television system, it is equally applicable to ground based television broadcast systems, both digital and analog or other video processing device having access to a program guide or the like. It is also applicable to other systems of assigning characteristics to television programs rather than the illustrated Topic_Theme system currently being used by DirecTV. Furthermore, the counter weight system could be different than the illustrated embodiment, as well as the formula used to calculate weights, Wp, for the programs in the program guide schedule.

What is claimed is:

1. A method for sorting a television program schedule to assist a user in selecting a television program for viewing or recording based on characteristics of television programs previously watched by said viewer comprising the steps of:

receiving a schedule of television programs to be broadcast comprising scheduled broadcast time and characteristics of said programs;

maintaining a user profile which comprises characteristic weights based on programs previously watched by said user;

allowing said user to select a future time period;

allowing said user to select between a first mode and a second mode for generating a list of suggested television programs;

periodically incrementing said characteristic weights according to a weighting algorithm comprising:

$$Wp(Rel1*Cth1+Rel2*Cth2+ \ldots +Reln*Cthn)+C2*(Ct1+Ct2+ \ldots +Ctn)$$

wherein:
Wp is a weight for a program in a program schedule guide;
each of Cth1, Cth2 ... Cthn corresponds to a value in a counter in the user profile for each of at least one characteristic comprising a topic and a theme in a format Topic_Theme that the program belongs to;
each of Rel1, Rel2 ... Reln is a corresponding characteristics relevancy factor for each at least one Topic_Theme in the program, p;
each of Ct1, Ct2 ... Ctn is an average weight for a plurality of Topics in the program;

$$Ct1=(Cth1+Cth12+ \ldots +Cth1m)/m;$$

Cth11 is the counter value for Topic 1_Theme 1, Cth12 is the counter value for Topic 1_Theme 2, ... Cth1m is the counter value for Topic 1_Theme m;
m is a Theme number in a first Topic; $Ctn=(Cthn1+Cthn2+ \ldots +Cthnp)/p$;
Cthn1 is a counter value for Topic n_Theme1;
Cthn2 is a counter value for Topic n_Theme 2,
Cthnp is a counter value for Topic n_Theme p;
p is a Theme number in an nth Topic;
wherein in said first mode, C2 is set to 1; and
wherein in said second mode, C2 is set to 0 and if any Topic-Theme counters corresponding to Topic Themes in a program, p, are 0, then Wp=0;
and generating a list of suggested television programs within said selected future time period based on said characteristics of scheduled television programs and said characteristic weights in said user profile,
wherein if said first mode is selected, a program having at least one characteristic which has a zero weight in said user profile can be suggested, and wherein if said second mode is selected, a program having at least one characteristic which has a zero weight in said user profile can not be suggested.

2. The method of claim 1 wherein said user may select a start time, and/or a stop time.

3. The method of claim 1 wherein a user selected time period can be saved as a default.

4. The method of claim 1 wherein a list of up to a predetermined number of programs meeting any user selected time period and desired characteristic criteria is displayed, in order of characteristic weights.

5. The method of claim 1 wherein upon sorting a list of suggested programs is displayed and a user may select a program from said list, whereupon said user is reminded of any selection from said list at or before the time said selected scheduled program is broadcasted.

6. The method of claim 1 wherein said characteristic weights are based on time watched and said at least one characteristics relevancy factor on a scale of 1 to 10 of characteristics of programs watched by a user.

7. The method of claim 1 wherein said characteristic weights are stored in counters which are incremented by said at least one characteristics relevancy factor for each time period during which a user views a television program having the characteristic and said at least one characteristics relevancy factor included in said program's broadcast information.

8. The method of claim 1 wherein said time period is five minutes and said counters are incremented by said at least one characteristics relevancy factor upon expiration of each said time period.

9. The method of claim 1 wherein said first of said at least two modes is a default mode and said second of said at least two modes may be selected at said user interface.

10. An apparatus for suggesting scheduled television programs to a user for viewing or recording based on characteristics of television programs previously watched by said viewer comprising:
means for receiving a schedule of television programs to be broadcast comprising scheduled broadcast time and characteristics of said programs; means for maintaining a user profile which comprises characteristic weights based on programs previously watched by said user;
first user interface means for allowing said user to select a future time period;
second user interface means for allowing said user to select between a first mode and a second mode for generating a list of suggested television programs;
first processor means for periodically incrementing said characteristic weights according to a weighting algorithm comprising:

$$Wp(Rel1*Cth1+Rel2*Cth2+: \ldots +Reln*Cthn)+C2*(Ct1+Ct2+ \ldots +Ctn)$$

wherein:
Wp is a weight for a program in a program schedule guide;
each of Cth1, Cth2 ... Cthn corresponds to a value in a counter in the user profile for each of at least one characteristic comprising a topic and a theme in a format Topic_Theme that the program belongs to;
each of Rel1, Rel2 ... Reln is a corresponding characteristics relevancy factor for the each at least one Topic_Theme in the program, p;
each of Ct1, Ct2 ... Ctn is an average weight for a plurality of Topics in the program;

$$Ct1=(Cth1+Cth12+ \ldots +Cth1m)/m;$$

Cth 11 is the counter value for Topic 1 Theme 1, Cth12 is the counter value for Topic1_Theme2, ... Cth1m is the counter value for Topic] Theme m;
m is a Theme number in a first Topic; $Ctn=(Cthn1+Cthn2+ \ldots +Cthnp)/p$;
Cthn1 is a counter value for Topic n_Theme 1;
Cthn2 is a counter value for Topic n_Theme 2;
Cthnp is a counter value for Topic n_Theme p;
p is a Theme number in an nth Topic;
wherein in said first mode, C2 is set to 1; and
wherein in said second mode, C2 is set to 0 and if any Topic-Theme counters corresponding to Topic Themes in a program, p, are 0, then Wp=0;
and second processor means for generating a list of suggested television programs within said selected future time period based on said characteristics of scheduled television programs and said characteristic weights in said user profile, wherein if said first mode is selected, a program having at least one characteristic which has a zero weight in said user profile can be suggested, and wherein if said second mode is selected, a program having at least one characteristic which has a zero weight in said user profile can not be suggested.

11. A system for generating a list of suggested scheduled television programs comprising:

means for receiving data comprising broadcast time and scheduled program characteristics of a plurality of scheduled television programs;

means for identifying a first television program being viewed by a user;

means for receiving data regarding a first program characteristic of the first television program, said first program characteristic being one of said scheduled program characteristics of said plurality of scheduled television programs;

means for storing a first relevancy factor for said first program characteristic;

means for storing a user profile for said user, said user profile including characteristic weights given by the user to the scheduled program characteristics of said plurality of scheduled television programs, said characteristic weights further including a weight for said first program characteristic of said first television program;

first processor means for periodically incrementing a weight for said first program characteristic in the user profile, wherein an incremented weight for said first program characteristic includes a number of time periods the first television program is watched by the user times the first relevancy factor for said first program characteristic;

first user interface means for selecting a future time period and for requesting a list of suggested scheduled television programs scheduled to be broadcast during said future time period;

second user interface means for selecting between a first mode and a second mode, wherein if said first mode is selected, a first one of said plurality of scheduled television programs having at least one of said scheduled program characteristics whose weight in said user profile is equal to zero is included with nonzero weighted programs in said list of suggested scheduled television programs, and if said second mode is selected, a second one of said scheduled television program having at least one of said scheduled program characteristics whose weight in said user profile is equal to zero is not included in said list of suggested scheduled television programs;

and further comprising second processor means for generating said list of suggested scheduled television programs by sorting said television program schedule data according to said scheduled program characteristics of said scheduled television programs, said characteristic weights in said user profile, said mode selection, and said future time period selection.

12. The system of claim 11 wherein said scheduled program characteristics comprise at least one Topic and at least one Theme, and wherein said first mode further comprises use of average weights for a plurality of Topics in said scheduled television programs in calculating the characteristic weight to be given to a scheduled program characteristic of said scheduled television program.

13. The system of claim 11 wherein said first of said at least two modes is a default mode and said second of said at least two modes can be selected at said user interface.

14. The system of claim 11 wherein said future time period is determined by a user selectable start time, stop time, and, optionally, broadcast day or days.

15. The system of claim 11 further including user interface means for saving a selected future time period as a default.

16. The system of claim 11 wherein said scheduled program characteristics comprise at least one category Topic and at least one category Theme in a format Topic_Theme, and further comprise a second relevancy factor for said Topic_Theme, and further wherein said characteristic weights in said user profile are calculated as the number of predetermined time periods a second television program having said Topic_Theme is viewed by a user times said second relevancy factor for said Topic_Theme.

17. The system of claim 11 further including means to identify one of a plurality of users and means to store a mode selection and/or a future time period selection of said identified user in a user profile.

18. The system of claim 11 wherein one or more scheduled television programs can be selected from said list of suggested television programs displayed at said user interface and added to a user list of scheduled television programs planned to be viewed by said user.

* * * * *